United States Patent [19]

Rayfield

[11] 4,245,716

[45] Jan. 20, 1981

[54] VEHICLE ACCESS LADDER

[75] Inventor: James F. Rayfield, New Holland, Pa.

[73] Assignee: Sperry Corporation, New Holland, Pa.

[21] Appl. No.: 58,392

[22] Filed: Jul. 17, 1979

[51] Int. Cl.³ .............................. B60R 3/00; E06C 5/22
[52] U.S. Cl. ........................................ 182/86; 182/89; 182/98; 182/127; 280/166
[58] Field of Search ..................... 182/97, 98, 127, 91, 182/89, 86, 85; 280/166

[56] References Cited

U.S. PATENT DOCUMENTS

| 1,568,846 | 1/1926 | Jones | 182/97 |
|---|---|---|---|
| 2,657,940 | 11/1953 | Davidson | 182/97 |
| 2,721,345 | 10/1955 | Aken | 182/98 |
| 2,967,584 | 1/1961 | Westerlund | 182/97 |
| 2,999,556 | 9/1961 | Horne | 182/89 |
| 3,083,785 | 4/1963 | Hyman | 182/89 |
| 3,190,392 | 6/1965 | Ashton | 182/97 |
| 3,232,376 | 2/1966 | Lucas | 182/97 |
| 3,508,627 | 4/1970 | Lypko | 182/97 |
| 3,656,578 | 4/1972 | Hemken | 182/97 |

FOREIGN PATENT DOCUMENTS 2207810   1/1973   Fed. Rep. of Germany .

Primary Examiner—Reinaldo P. Machado
Attorney, Agent, or Firm—Frank A. Seemar; Larry W. Miller; John B. Mitchell

[57] ABSTRACT

The instant disclosure is directed to an access ladder for the elevated operator's platform of a vehicle, the ladder being pivotable in two planes between operative and inoperative positions about two separate axes. Counterbalance means interconnecting the ladder and the platform assist pivotal movement in the first plane. A biased locking mechanism releasably holds the ladder in the operable position relative to the second plane.

8 Claims, 5 Drawing Figures

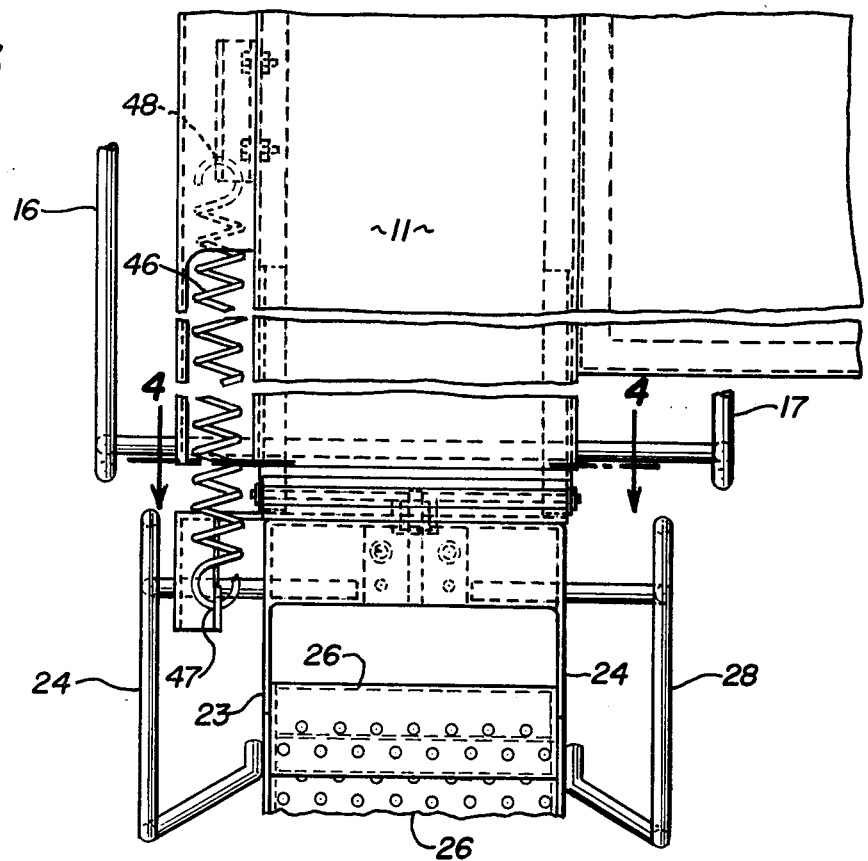
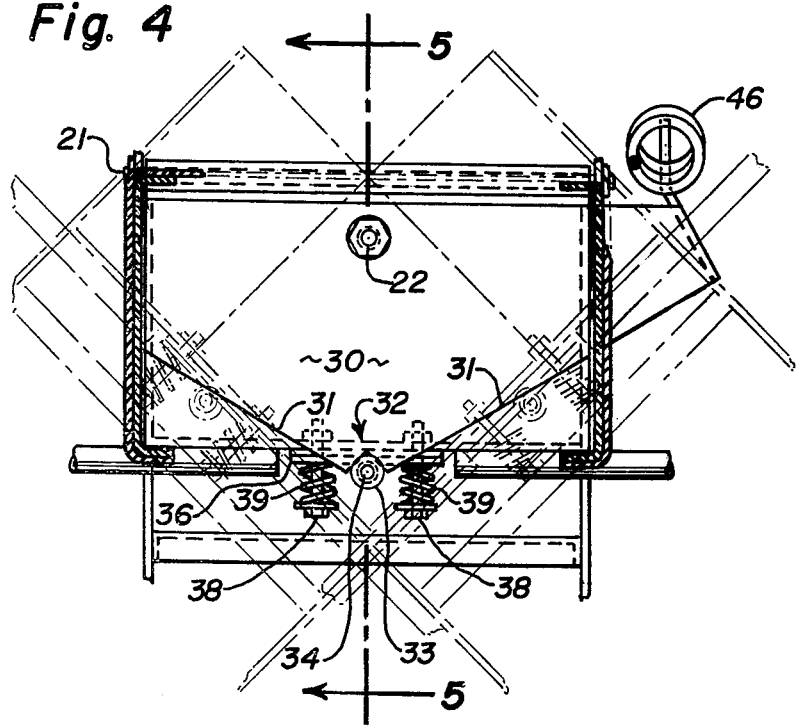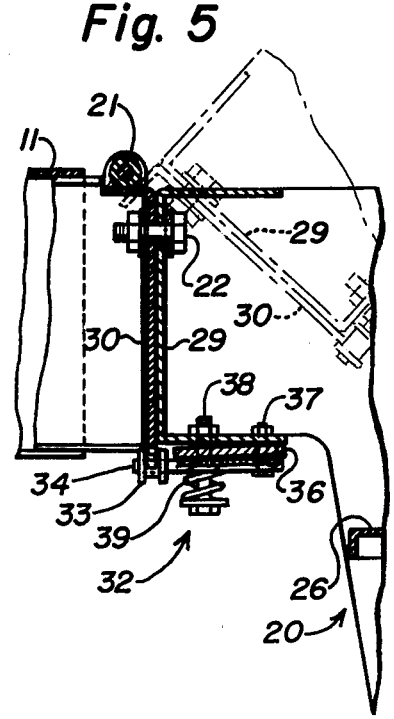

VEHICLE ACCESS LADDER

BACKGROUND OF THE INVENTION

This invention relates generally to an access ladder for the elevated operator's platform of a vehicle, and specifically to such a ladder which is pivotable about two separate axes.

The size and configuration of certain self-propelled agricultural vehicles, particularly the modern combine, has dictated the use of an operator's platform which is positioned at a substantially elevated location above the ground. The operator's platform of a combine is conventionally located above the threshing mechanism of the combine and a relatively large pair of front drive wheels. Access to the platform is gained by a ladder extending downwardly therefrom to a location convenient to the ground.

This type of access ladder, though convenient, presents a number of problems to the effective operation of the vehicle. Many times, because of the location of the platform relative to the large front drive wheels, the ladder protrudes beyond the outer edge of a wheel, thus increasing the overall width of the machine and hindering transport. Furthermore, a depending ladder creates an obstacle during field operations which may be engaged by standing crops and either damaged itself by the impact or cause damage to the standing crop. Moreover, any protrusion beyond the width of the wheels increases the possibility of adverse contact with buildings, gates, other vehicles and similar obstacles commonly found in the area which the combine operates.

BRIEF SUMMARY OF THE INVENTION

It is an object of the instant invention to provide an access ladder for the elevated operator's platform of a vehicle which is constructed in such a manner so as to reduce the likelihood of damage thereto through impact with obstacles.

It is another object of the instant invention to provide an access ladder for the elevated operator's platform of a vehicle which is movable between operative and inoperative positions.

It is a further object of the instant invention to provide an access ladder for the elevated operator's platform of a vehicle which is simple of construction and inexpensive of manufacture.

It is a further feature of the instant invention to provide an access ladder for the elevated operator's platform of a vehicle which can absorb certain forces caused by impact thereof with obstacles.

It is a feature of the instant invention that an access ladder for the elevated operator's platform of a vehicle is pivotable in two planes.

It is a further feature of the instant invention that an access ladder for the elevated operator's platform of a vehicle is pivotable in two separate planes.

It is an even further feature of the instant invention that an access ladder for the elevated operator's platform of a vehicle is pivotable between operative and inoperative positions about two separate axes.

These and other objects, features and advantages are attained according to the instant invention by the provision of an access ladder for the elevated operator's platform of a vehicle, the ladder being pivotable in two planes between operative and inoperative positions about two separate axes. Counterbalance means interconnecting the ladder and the platform assists pivotal movement in the first plane. A biased locking mechanism releasably holds the ladder in the operable position relative to the second plane.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a partial top elevational view of the operator's platform and access ladder taken along lines 3—3 of FIG. 2;

FIG. 4 is a cross sectional view of the interface area between the access ladder and the operator's platform, taken along lines 4—4 of FIG. 3; and FIG. 5 is a partial cross sectional view of the access ladder/operator's platform interface taken along lines 5—5 of FIG. 4.

DESCRIPTION OF THE PREFERRED EMBODIMENT

Figure 1:
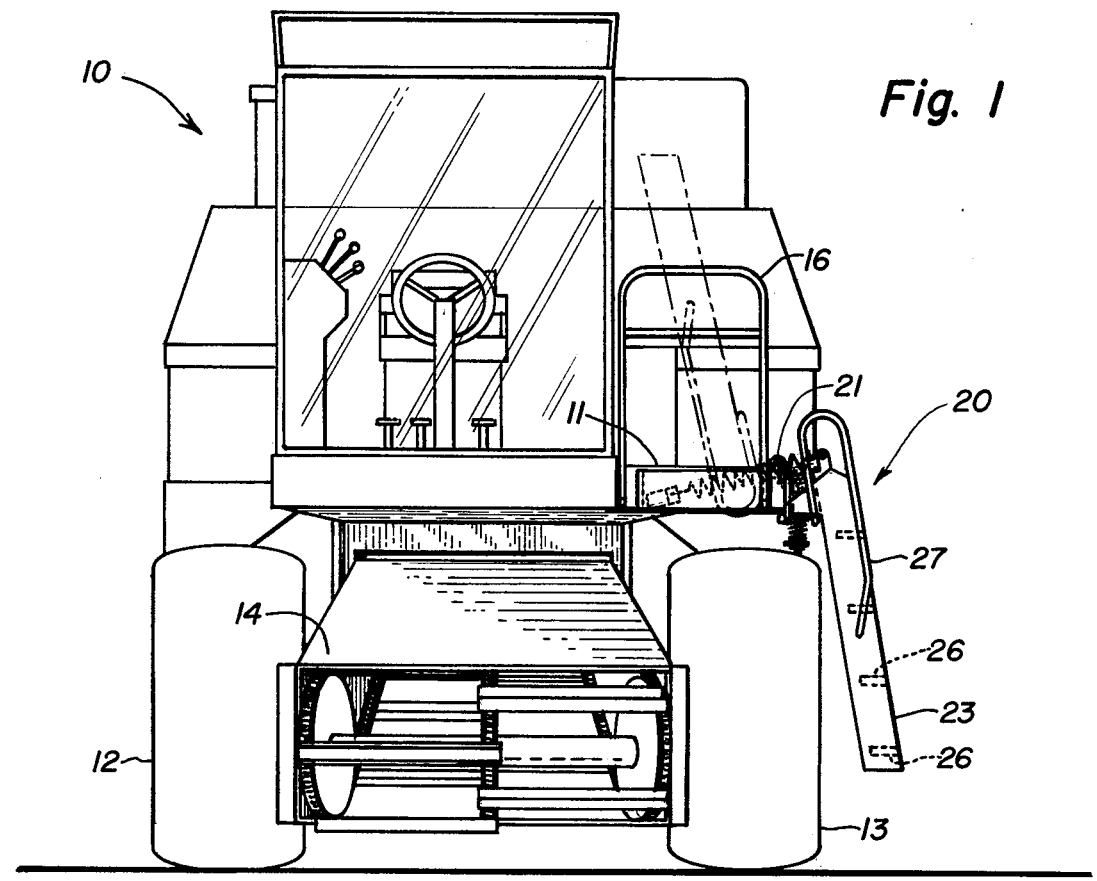
FIG. 1 is a front elevational view of a combine employing the access ladder of the instant invention.
Figure 2:
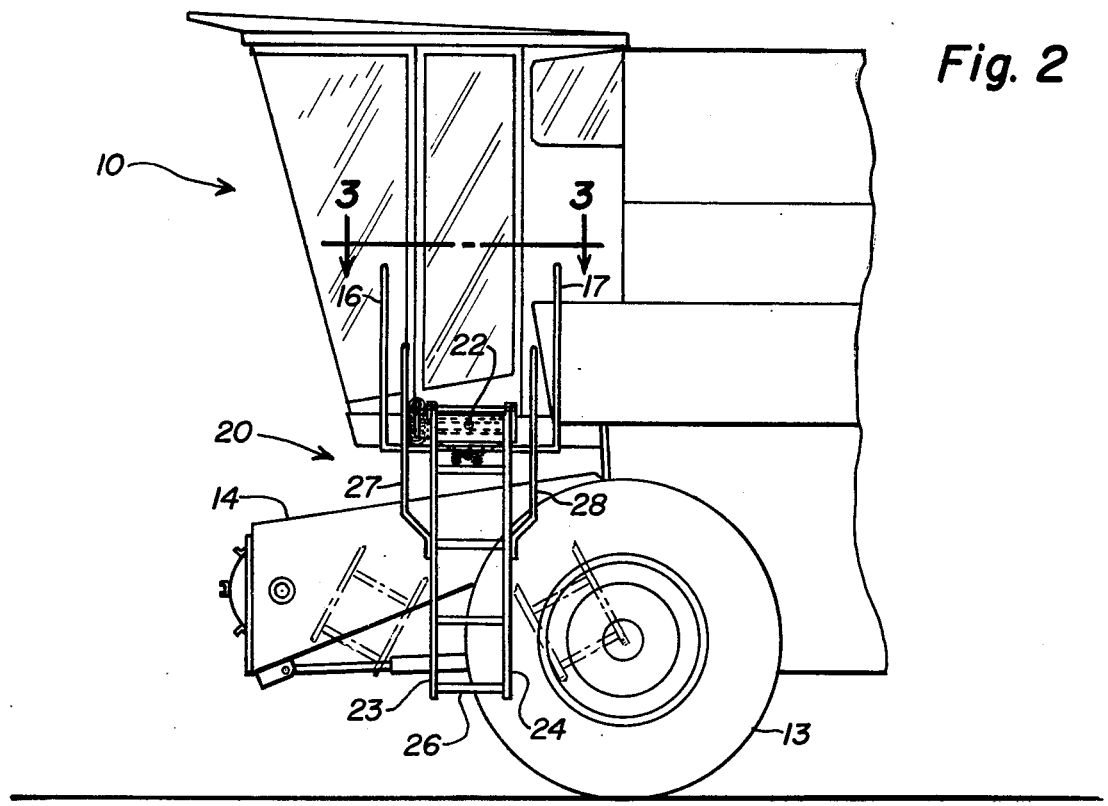
FIG. 2 is a side elevational view of the combine of FIG. 1.

Directing attention now to FIGS. 1 and 2, a general explanation of the operation of the access ladder of the instant invention will be provided. A combine 10 is shown to include a main body portion within which the operational components of the combine are housed. The front portion of the combine 10 is movably supported by a pair of large tires 12 and 13 above which an operator's platform 11 is supported. The term "operator's platform" is used to designate that area or level of the combine which support the main controls such as steering, braking, etc. In the particular embodiment shown, the operator's platform extends laterally outwardly above left hand tire 13. It should be understood that the actual number of access ladders and specific location on the machine has relatively nothing to do with the scope of the invention to be described. Primarily, the location of the operator's platform 11 is selected so that the operator can have optimum visual contact with the actual harvesting components (not shown) which affix to the feeder housing 14 on the forward portion of the combine.

A portion of the operator's platform is shown to be bounded by a pair of opposing hand rails 16 and 17 to promote safety and ease of use. The access ladder 20 of the instant invention is shown in FIG. 1 to be pivotable about a first axis 21 between the operable position shown in solid line and the inoperable position shown in dotted line. Generally, it is contemplated that the dotted line position would be that used for transport and/or field use.

Referring now to FIG. 2, it can be seen that the access ladder 20 is further pivotable in a second plane about a second axis 22 between the solid line and the dotted line positions shown. It should be understood that the dotted line positions shown in FIG. 2 are not limitations, the ladder being capable of more than the 45 degree movements depicted. With the ladder in the down position, it is highly advantageous for it to be able to pivot in the directions shown in FIG. 2 to prevent damage thereto upon contact with fixed objects.

Ladder 20 is shown to more specifically comprise a pair of substantially identical opposing side members 23 and 24 generally interconnected by a plurality of spaced apart steps 26. Opposing hand rails 27 and 28 are affixed, respectively, to side members 23 and 24 and substantially form a unitary main body structure therewith. The top of the ladder comprises a box-like structure with a plate 29 forming a vertical wall thereof (see FIG. 5).

Vertical plate 29 is affixed to a second vertical plate 30 by a bolt and nut arrangement which forms the axis 22. Thus, plate 29, and the main body structure of ladder 20, is pivotable about axis 22 relative to plate 30 as shown in dotted line in FIG. 4. The dotted line positions of FIG. 4 represent 45 degree relative movements in two directions about axis 22. As stated, these positions should not be considered as limitations.

As can be seen in FIGS. 3 through 5, and particularly FIG. 4, plate 30 includes a generally V-shaped peripheral edge portion 31 with a notch 32 formed therein. A releasable locking means 32 is affixed to the main body structure of ladder 20 immediately adjacent plate 29. This locking means comprises a roller 33 rotatably affixed to a shaft 34 which is, in turn, fixed to a smaller plate 36. Plate 36 is affixed, at the side thereof remote from roller 33 by a bolt 37 to the main body structure. A second bolt 38 extends through the plate 36 and retains a spring 39 thereon which biases plate 36, and thus roller 33, in an upward direction. As can probably best be seen in FIG. 4, the preferred embodiment includes a pair of bolts 38 and springs 39 acting on opposed sides of roller 33. Thus, it can be seen that the roller 33 locks plate 29 in a fixed relationship with plate 30 about axes 22. However, the exertion of a lateral force on the main body structure of the ladder sufficient to overcome the bias of springs 39 will cause roller 33 to move out of notch 32 and follow generally the contour of surfaces 31 of plate 30. Though not absolutely necessary, it is contemplated that the angle of surfaces 31 and the forces exerted by springs 39 will be sufficient to create enough friction between roller 33 and peripheral surface 31 to hold the main body structure of the ladder at whatever angle the lateral force may determine. Then, to put the ladder back into the neutral, or locked position the main body structure of the ladder must be moved manually vertical so that roller 33 is again contained within notch 32.

As best seen in FIG. 5, plate 30 has an upper L-shaped portion which is affixed to a pin which forms axis 21. Since, as shown in FIG. 5, plates 29 and 30 are free to move about axis 21, the main body structure of the ladder 20 may be pivoted about axis 21 to a more or less vertical position shown in dotted line in FIG. 1.

Since a ladder of this nature is generally fairly heavy and difficult to manually manipulate, a spring 46 is affixed to a bracket or plate 30 at 47 (see FIG. 3) and to the operator's platform at 48 and is selected to provide a counterbalance force for the weight of the ladder to assist in movement between the operative and inoperative positions.

In use, it is contemplated that the operator will normally climb to the platform and pull the access ladder to the "up" position about axis 21 by the hand rails 27 and 28. Dismounting the vehicle is accomplished by reversing the procedure. If, for any reason, the ladder is not raised, the ability of the device to pivot about axis 22 will greatly minimize the likelihood of structural damage in the event of contact between the ladder and a stationary object. Thus, there has been described a novel access ladder which is pivotable about two separate substantially perpendicular axes which promotes convenience, safety and durability beyond that heretofore known.

It will be understood that various other changes of the details, materials, steps, arrangement of parts and uses which have been herein described and illustrated in order to explain the nature of the invention will occur to and may be made by those skilled in the art, upon a reading of this disclosure, and such changes are intended to be included within the principles and scope of this invention.

For example, coil springs have been demonstrated and described as being quite sufficient for biasing roller 33 into contact with surface 31. One of skill in the art will readily realize that leaf springs and/or a single spring could prove suitable under certain circumstances. Also, a single spring 46 has been shown as the means by which the ladder is counterbalanced between its operative and inoperative positions. Multiple springs, or a cable/spring arrangement, or a spring in another location could also prove quite satisfactory.

Having thus described the invention, what is claimed is:

1. In a vehicle having an elevated operator's platform with an elongate access ladder having a first end and an opposing second end, and means affixing said ladder to said platform, said means affixing said ladder to said platform having:
   (a) a first plate rigidly affixed to said ladder adjacent said first end thereof;
   (b) a second plate pivotally affixed to said platform for movement in a first plane about a first horizontal axis; and
   (c) connecting means pivotally affixing said first plate to said second plate for movement in a second plane about a second axis, said first and second planes being substantially perpendicular to each other.

2. The vehicle of claim 1 further including:
   counterbalance means connected to said ladder adjacent said first end thereof and said platform to counterbalance the weight of said ladder during pivotal movement thereof in said first plane.

3. The vehicle of claim 2 wherein said counterbalance means comprises a spring.

4. The vehicle of claim 1 wherein said means affixing said ladder to said platform further comprises:
   releasable lock means for maintaining the positional relationship between said first and second plates.

5. The vehicle of claim 4 wherein said second plate has a peripheral edge with a notch therein and said releasable lock means further comprises:
   a roller mechanism affixed to said ladder spring biased into contact with said peripheral edge of said second plate whereby movement of said ladder about said second axis causes said roller mechanism to move along said peripheral edge of said second plate and into and out of engagement with said notch in said second plate.

6. The vehicle of claim 5 further including counterbalance means connected to said ladder adjacent said first end thereof and said platform to counterbalance the weight of said ladder during pivotal movement thereof in said first plane.

7. In a vehicle having longitudinal and transverse dimensions and an operator's platform with a rigid elongate ladder extending generally downwardly therefrom, said ladder having a first end and an opposing second end, the improvement wherein:

said ladder is affixed to said platform at the first end thereof by a first surface and a second surface rotatably mounted relative to said first surface thereby forming a pivotal connecting means which permits said second end of said ladder to pivot in a first plane substantially parallel to said transverse dimension of said vehicle and in a second plane substantially parallel to said longitudinal dimension of said vehicle, said first and second surfaces further being cooperatively interlocked by surface interlocking means such that force applied along the longitudinal dimension above a predetermined level will cause said ladder to pivot in said second plane and below said predetermined level permit the ladder to remain in the generally downwardly extending position.

8. In a vehicle having a longitudinal axis and a transverse axis with an elevated operator's platform having a ladder extending generally downwardly therefrom, the improvement comprising:

said ladder being affixed to said platform by connecting means for pivotal movement in two perpendicular planes, the first of said planes being substantially parallel to said transverse axis and the second of said planes being substantially parallel to said longitudinal axis, said connecting means further comprising a first surface and a second surface interlockingly connected along angled surfaces so that upon contacting an obstruction with a force above a predetermined level said ladder pivots in said second plane to prevent said ladder from being damaged and below said predetermined level remains in said generally downwardly extending position.

* * * * *